Jan. 20, 1925.

M. RACHBAUER 1,523,715

AEROPLANE PASSENGER TRANSFER APPARATUS

Filed Sept. 20, 1923     2 Sheets-Sheet 1

INVENTOR
Mary Rachbauer
BY
ATTORNEY

Jan. 20, 1925.　　　　　　　　　　　　　　　　　　　1,523,715
M. RACHBAUER
AEROPLANE PASSENGER TRANSFER APPARATUS
Filed Sept. 20, 1923　　2 Sheets-Sheet 2
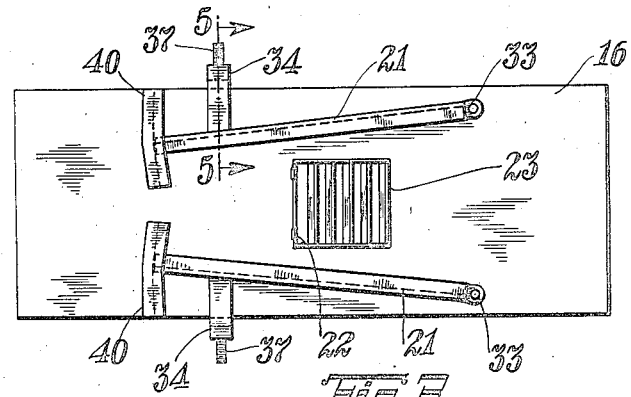
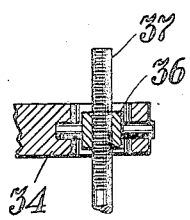
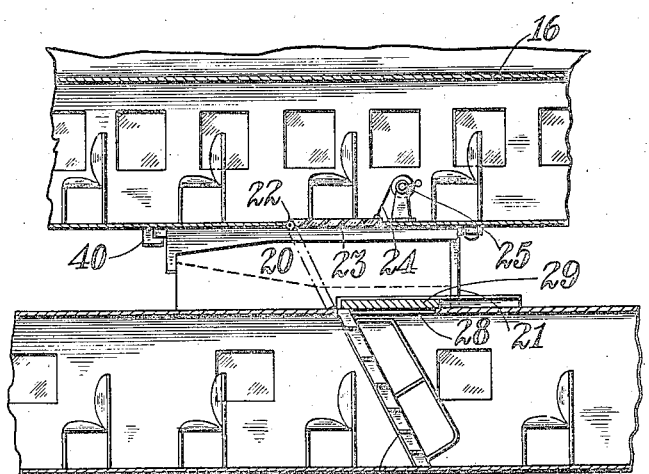
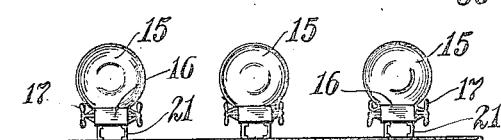
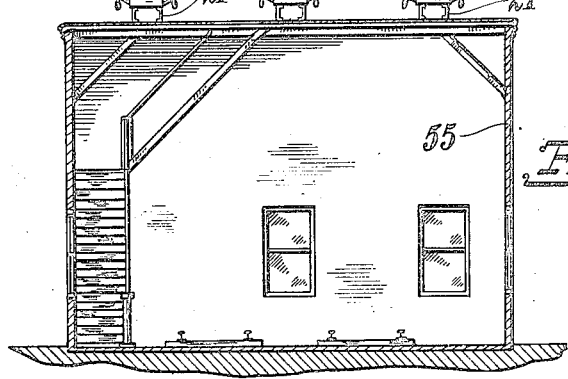
INVENTOR
Mary Rachbauer
BY
ATTORNEY Patented Jan. 20, 1925.

1,523,715

UNITED STATES PATENT OFFICE.

MARY RACHBAUER, OF DURHAM, CONNECTICUT.

AEROPLANE PASSENGER-TRANSFER APPARATUS.

Application filed September 20, 1923. Serial No. 663,880.

*To all whom it may concern:*

Be it known that I, MARY RACHBAUER, a citizen of the United States, residing at Durham, in the county of Middlesex and State of Connecticut, have invented certain new and useful Improvements in Aeroplane Passenger-Transfer Apparatus, of which the following is a specification.

This invention relates generally to flying machines having more particular reference to the provision of means whereby passengers may be transferred during flight from one machine to the other, the invention being intended more particularly for use in connection with long distance passenger aeroplanes, and having for an object to enable such machines to receive and discharge passengers at the stations along the route without the need of making a landing, thus resulting in the saving of the space which woud be necessary for such machines to effect a landing.

For further comprehension of the invention, and of the objects and advantages thereof, reference will be had to the following description and accompanying drawings, and to the appended claims in which the various novel features of the invention are more particularly set forth.

Fig. 1 of the drawings is a side view showing a passenger aeroplane in contact with a dirigible ballon to receive and discharge passengers.

Fig. 3 is an underside plan view of the car of the dirigible.

Fig. 4 is an enlarged fragmentary longitudinal sectional view taken on the line 4—4 of Fig. 2.

Fig. 5 is a fragmentary transverse vertical sectional view taken on the line 5—5 of Fig. 3.

Fig. 6 is an elevational view indicating a landing terminal for the dirigibles.

Figure 1:
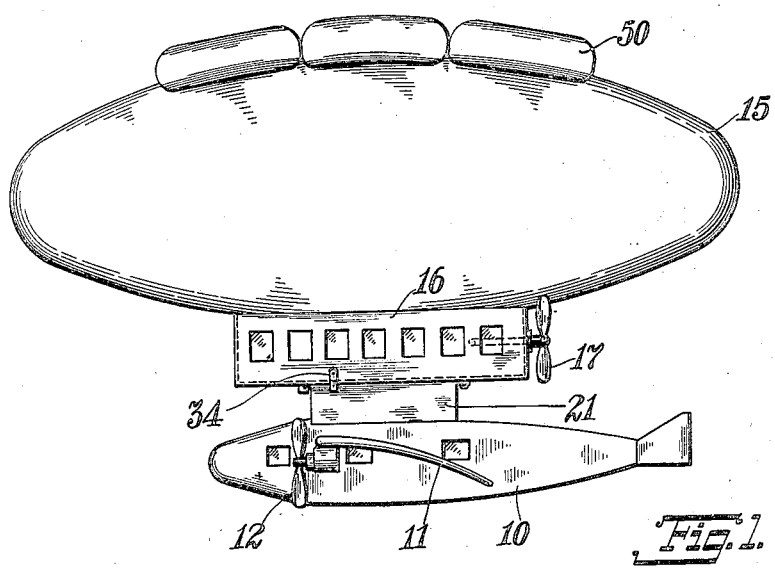
Figure 2:
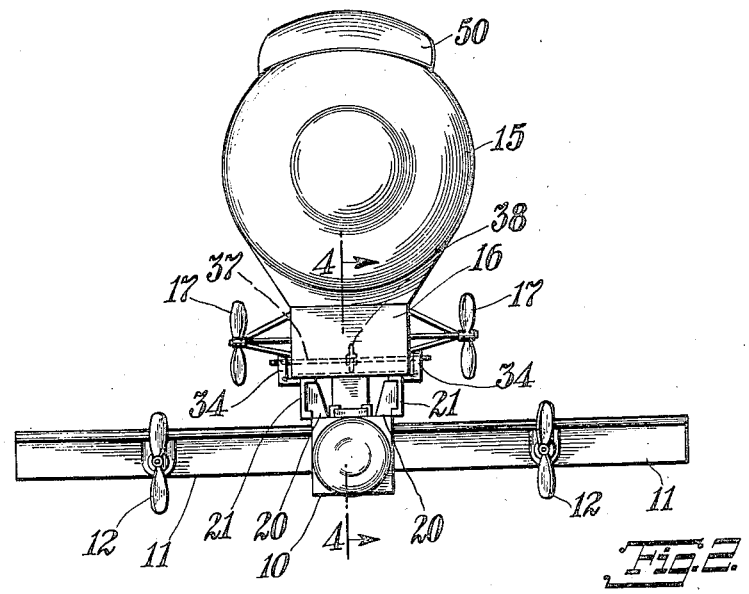
Fig. 2 is an end view thereof.

Briefly speaking, in carrying out my invention, I make use of dirigible balloons, one of which is located at each station along the route of a passenger aeroplane and through the medium of which the passengers are transferred to and from the aeroplane while the latter is in flight. Referring now to the drawings the reference numeral 10 indicates the body or car, and 11 the wings of the aeroplane, which may be driven by a pair of propellers 12 connected to suitable motors and which may be provided with the usual control means.

The reference numeral 15 indicates the gas bag of a dirigible ballon, and 16 the car suspended thereunder, the dirigible being provided with propellers 17, driven by suitable motors, and having also the usual control means not necessary to be here shown. On the lower side of the dirigible car 16 and the top side of the aeroplane car 10 respectively are provided elements which are adapted to be inter-engaged to hold the two machines in fixed relation to each other while the passengers are being transferred.

This means comprises a pair of outwardly facing ribs 20 fixed to the top of the aeroplane car and which are inclined forwardly and inwardly toward one another, these ribs tapering also vertically near their forward ends. Mounted on the underside of the car 16 are complementary members 21 which receive the ribs 20 when the two machines are engaged with one another. Hinged as at 22 in the flooring of the car 16 is a stairway 23 which normally lies in the plane of the floor and which is adapted to be lowered to have its lower end rest on the roof of the car 10 for the change of the passengers from one car to the other. The free end of this stairway may have connected thereto a rope 24 whose opposite end is connected to a winding drum or winch 25 of ordinary construction. Formed in the roof of the car 10 is an opening 28 which may be covered by a sliding door 29, or any other suitable type of door, and from which a stairway 30 leads downward into the interior of the aeroplane car.

To permit of the ready disengagement of the aeroplane from the dirigible after the transfer of passengers, the recessed members 21 are arranged to have their front ends swung apart so as to free these members from the ribs 20. To this end these members are hinged to the body at their rear ends as at 33 and a pair of arms 34 are fixed thereto near their front ends and project upward at the sides of the car 16 and have rotatably mounted therein such as 36 nuts which are engaged by the respectively right and left hand threads on opposite ends of a screw 37 which has a handwheel 38 mounted thereon for turning purposes, this screw passing freely through suitable longitudinal slots in the side walls of the car 16. At their forward ends the members 21 may engage in the arcuate guide elements 40.

In the use of the invention, the passengers desiring to board the aeroplane at a given point enter the car of the dirigible before the aeroplane is due, the dirigible rising in the air and as the aeroplane approaches starts running in the same direction as the latter, though at a slightly less speed. The pilot of the aeroplane steers the latter under the dirigible until the ribs 20 engage in the members 21 thus holding the two machines together. The stairway 23 is immediately lowered and the door 29 opened and the passengers transfer from one machine to the other. The screw 37 is then rotated to separate the front ends of the members 21, allowing the aeroplane to move forward from under the dirigible. The latter then returns to its station while the aeroplane continues on its route.

To facilitate direct up and down movement of the dirigible the latter may have a number of supplementary gas bags 50 mounted on it, this bag being inflated before the dirigible leaves the station and successively deflated as required.

In Fig. 6 I have indicated a landing terminal for the dirigibles comprising a flat-topped building 55 on the roof of which a number of the dirigibles may land.

Having thus described my invention what I claim as new and desire to protect by Letters Patent of the United States is as follows:

1. In combination, a dirigible and an aeroplane, and means thereon whereby the same may be united together to travel for a distance in unison, said means including longitudinal ribs on the aeroplane, and recessed members on the dirigible adapted to receive said ribs, said ribs and recessed members inclining forwardly toward one another.

2. In combination, a dirigible and an aeroplane, and means thereon whereby the same may be united together to travel for a distance in unison, said means including longitudinal ribs on the aeroplane, and recessed members on the dirigible adapted to receive said ribs, said ribs and recessed members inclining forwardly towards one another, and means for moving said recessed members laterally to free them from the said ribs.

3. In combination, a dirigible and an aeroplane, and means thereon whereby the same may be united together to travel for a distance in unison, said means including longitudinal ribs on the aeroplane, and recessed members on the dirigible adapted to receive said ribs, said ribs and recessed members inclining forwardly toward one another, said recessed members being hinged at their rear ends to the dirigible, and screw devices for swinging their front ends laterally to free them from the said ribs.

In testimony whereof I have affixed my signature.

MARY RACHBAUER.